Nov. 3, 1925.
F. M. HILLS ET AL
1,559,872
EXCESS SPEED ALARM
Filed March 14, 1922  3 Sheets-Sheet 1
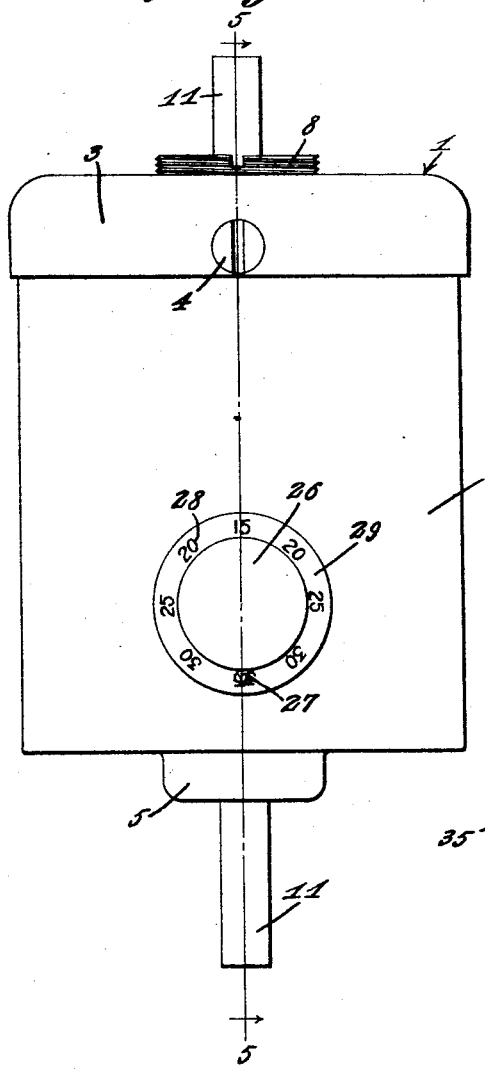
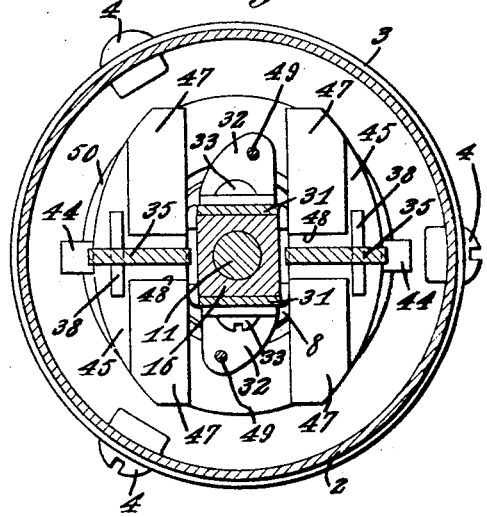
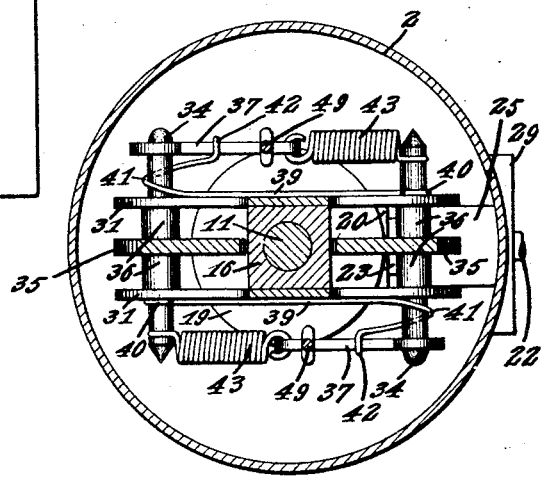
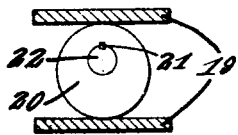
F. M. Hills and J. G. Ambrose, Inventors Nov. 3, 1925.
F. M. HILLS ET AL
1,559,872
EXCESS SPEED ALARM
Filed March 14, 1922  3 Sheets-Sheet 2
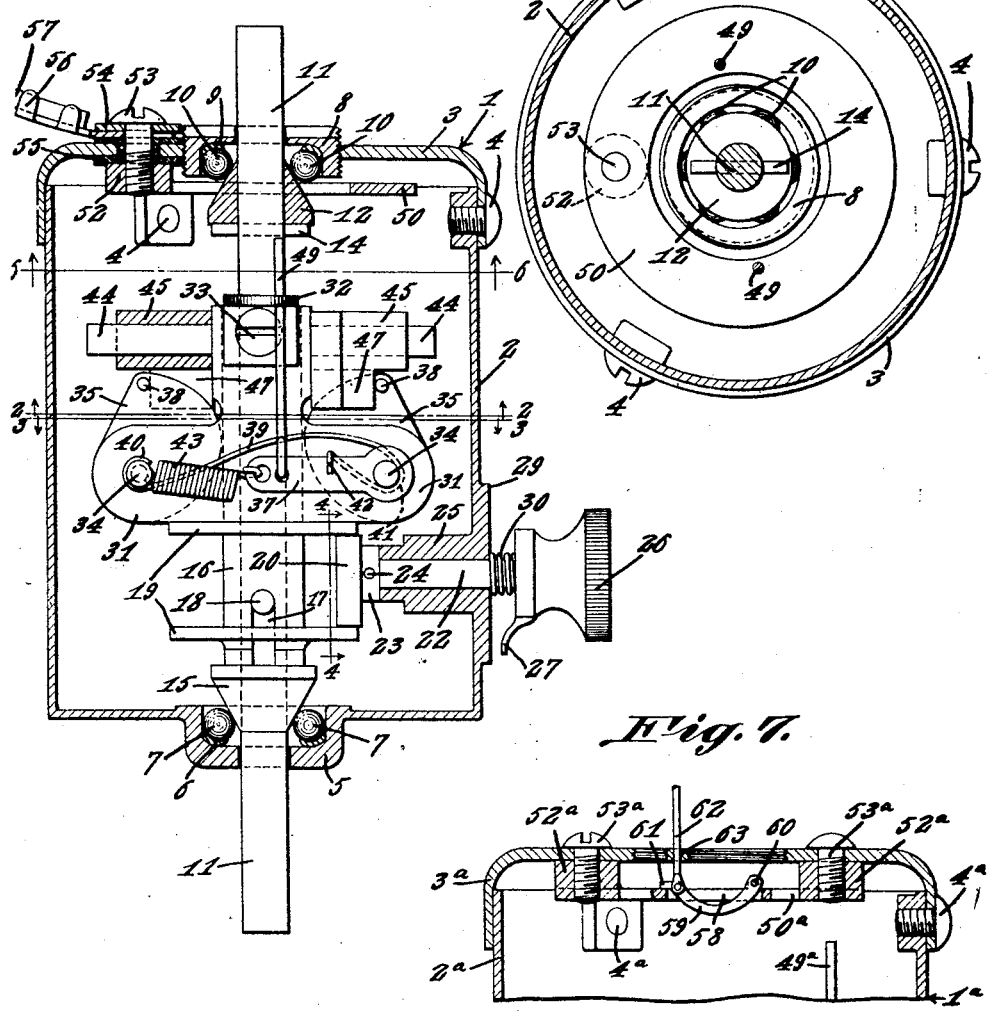
F. M. Hills and J. G. Ambrose, Inventors
By C. A. Snow & Co.
Attorneys Nov. 3, 1925.
F. M. HILLS ET AL
1,559,872
EXCESS SPEED ALARM
Filed March 14, 1922   3 Sheets-Sheet 3
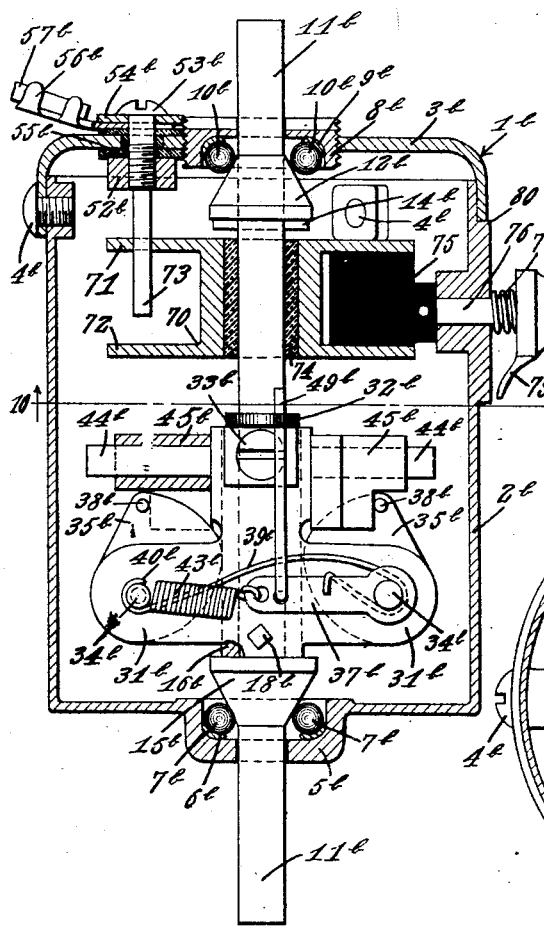
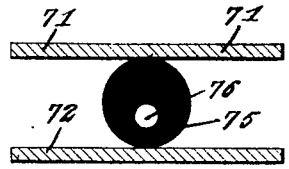
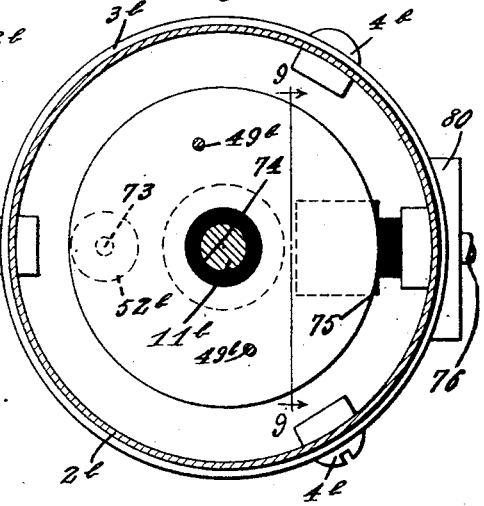
F. M. Hills and J. G. Ambrose, Inventors Patented Nov. 3, 1925.

1,559,872

UNITED STATES PATENT OFFICE.

FRED M. HILLS AND JENNINGS G. AMBROSE, OF SAN DIEGO, CALIFORNIA; SAID HILLS ASSIGNOR TO SAID AMBROSE.

EXCESS-SPEED ALARM.

Application filed March 14, 1922. Serial No. 543,738.

*To all whom it may concern:*

Be it known that we, FRED M. HILLS and JENNINGS G. AMBROSE, citizens of the United States, residing at San Diego, in the county of San Diego, State of California, have invented a new and useful Excess-Speed Alarm, of which the following is a specification.

This invention aims to provide simple means whereby a signal may be given when an automobile attains a predetermined speed, the device being adapted to be operated, preferably, but not necessarily in connection with the shaft which runs the speedometer, the general purpose of the structure being to give an admonishing signal to the driver of a car, which will permit him to govern his acts in accordance with the speed regulations of the locality in which he happens to be.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in elevation, a device constructed in accordance with the invention; Figure 2 is a cross section on the line 2—2 of Figure 5; Figure 3 is a cross section on the line 3—3 of Figure 5; Figure 4 is a cross section on the line 4—4 of Figure 5; Figure 5 is a longitudinal section on the line 5—5 of Figure 1, parts remaining in elevation; Figure 6 is a section on the line 6—6 of Figure 5; Figure 7 is a fragmental transverse section showing a modification; Figure 8 is a longitudinal section showing a modified form of the invention; Figure 9 is a sectional detail; Figure 10 is a section on the line 10—10 of Figure 8, the line 9—9 in Figure 10 indicating the plane on which Figure 9 is taken.

In carrying out the invention, there is provided a support or casing 1 including a body 2, a lid 3 being mounted on the body, and being held thereon by securing elements 4. The body 2 is provided in one end with a seat 5, carrying a race 6, supporting balls 7. A seat 8 is threaded or mounted otherwise in the lid 3 and is provided with a race 9, coacting with balls 10. A main shaft 11 extends through the seat 5 and through the seat 8 and is equipped with a cone bearing 12 cooperating with the balls, the bearing being held in place by a securing element 14. A cone bearing 15 is attached to the shaft 11 and coacts with the balls 7. The shaft 11, thus, is held in the casing 1 for rotation, but, against longitudinal movement therein.

A slide or carrier 16, which may be in the form of a bar, having a rectangular cross section is mounted for adjustable reciprocation on the shaft 11 and is provided in its lower end with a slot 17, receiving a projection or pin 18 extending from the shaft 11, the construction being such that although the slide 16 may be adjusted longitudinally of the shaft 11, the slide, nevertheless, will be held on the shaft, for rotation therewith. Adjacent to its lower end, the slide 16 is supplied with flanges 19. An eccentric 20 operates between the flanges 19 of the slide 16 and is secured to a shaft 22, an abutment collar 23 being attached at 24 to the shaft 22. The shaft 22 is journaled in a bearing 25 projecting inwardly from the body 2 of the casing 1, the collar 23 cooperating with the inner end of the bearing 25. A turning head 26 is secured to the outer end of the shaft 22 and has an index 27 adapted to cooperate with a dial 28 inscribed on the end of a boss 29 projecting outwardly from the body 2 of the casing 1. A compression spring 30 surrounds a portion of the shaft 22, one end of the spring abutting against the turning head 26, and the other end of the spring abutting against the boss 29, to hold the collar 23 in abutment with the inner end of the bearing 25. The abutment collar 23 has a frictional hold on the bearing 25, of sufficient strength so that the shaft 22 will not rotate accidentally, it being possible, however to impart rotation to the shaft 22 through the instrumentality of the turning head 26.

Inverted T-shaped side plates 31 are mounted on the slide 16. At the upper ends of the side plates 31, guides 32, in the form of angle pieces, are located. Securing elements 33 pass through the guide pieces 32 and through the side plates 31, the securing elements entering the slide 16 and serving to hold both the guides and the side plates on the slide. Shafts 34 are mounted to rock in the side plates 31 and are disposed on opposite sides of the slide 16, as shown in Figure 3. Inner arms 35 are provided and are adapted to rest against the slide 16, the arms 35 being located between the side plates 31 and being provided with hubs 36 extended between the side plates and secured to the shafts 34. Adjacent to their upper ends, the inner arms 35 carry lateral projections 38, in the form of pins. External arms 37 are supplied, the arms 37 being located outwardly of the side plates 31, as shown in Figure 3. The arms 37 project in opposite directions, one arm 37 being secured to one of the shafts 34, and the other of the arms 37 being secured to the other shaft 34. Spring strips 39 are supplied, and, generally stated, are of U-shape. One end of each spring strip 39 is hooked at 40 around the end of one shaft 34, the spring strip being looped at 41 around the other shaft 34 and terminating in a hook 42 engaged over the adjacent external arm 37. Retractile helical springs 43 are provided, each spring 43 being connected at one end to one of the shafts 34, and being connected, at its other end to the adjacent arm 37 on the other shaft 34.

Outwardly extended guide studs 44 project from the slide 16, and on these studs, weights 45 are mounted to slide inwardly and outwardly, in a direction substantially at right angles to the axis of the main shaft 11. Each weight 45 has a depending portion 47 located behind the corresponding pin or projection 38 of the inner arm 35, the said depending portions of the weights 45 having slots 48 adapted to receive the arms 35, as shown best in Figure 2, Figure 5 being noted at this point.

Contact members, in the form of rods 49 are mounted to slide in the guide pieces 32 and constitute signal actuators, the inner ends of the contact members 49 being mounted pivotally in the external arms 37, adjacent to the free inner ends thereof. A terminal is carried by the lid 3 and it is with this terminal that the contact members 49 cooperate. The terminal may be in the form of an annular track 50 having a boss 52. A securing element 53 is carried by the lid 3, a washer 54 being mounted on the securing element. The securing element 53 passes through an insulating bushing 55 in the lid 3 and engages the hub or boss 52 on the track 50, the track thus being held on the lid 3 in such a position that the contact members 49 may cooperate with the track, under circumstances which will be pointed out hereinafter. A connector 56 surrounds the securing element 53 and is held by the washer 54 in contact with one end of the insulating bushing 55, the connector 46 being adapted to retain an electrical conductor 57.

The lower end of the shaft 11 is adapted to be connected to the cable which operates a speedometer, the upper end of the shaft being adapted to be connected to the speedometer.

In practical operation, when rotation is imparted to the shaft 11, rotation will be imparted to the slide 16, the slide being connected to the shaft by way of the projection or pin 18. As the speed builds up, the weights 45 move outwardly, in opposite directions, motion being transmitted to the inner arms 35 through the instrumentality of the projections or pins 38. As the arms 35 swing outwardly, the shafts 34 are rocked, the contact members 49 are raised, because they are connected pivotally with the external arms 37, the contact members 49 engaging the track 50 whereupon, the circuit including the conductor 57, is grounded, and a signal (not shown) located in the circuit of which the conductor 57 constitutes a part, is sounded. There is an advantage in providing two of the contact members, since, if one of them should prove inoperative, the other will still exercise its function and ground the signal circuit. When the external arms 37 swing upwardly, the spring strips 39 are first put under tension, and, then, as a maximum speed is approached, the helical springs 43 are expanded and put under tension.

Rotation may be imparted to the shaft 22, by way of the turning head 26, the finger or index 27 cooperating with the dial 28, to indicate the speed at which it is desired that the signal shall sound. When the shaft 22 is rotated, the eccentric 20, cooperating with the uppermost flange 19, raises the slide 16 on the shaft 11, the eccentric operating between the flanges 19. When the slide 16 is raised, the upper ends of the contact members 49 are caused to approach the track 50, by adjustment, before the said contact members are operated through the instrumentality of the weights 45 and coacting parts. The structure, therefore, may be set so that the signal will sound, at any predetermined speed of travel in the vehicle.

Although the device has been described as operating electrically, it may operate otherwise. Thus, in Figure 7, parts hereinbefore described have been designed by numerals previously used with the suffix "a". In the modification, the track $50^a$ has two or more bosses $52^a$ connected by a corresponding number of securing elements $53^a$ with the lid $3^a$. The track $50^a$ has a slot 58 wherein operates a curved lever 59, the lever being fulcrumed at one end, as at 60 on the track, the opposite end 61 of the lever being adapted to cooperate with the track at one end of the slot 58, to limit the downward swinging movement of the lever. An operating rod 62 is pivoted to the lever 59 and slides in a guide 63 which may be carried by the seat 8 of Figure 5 or be mounted otherwise. The downwardly curved lever 59 lies in the path of the signal actuator 49$^a$ and, when the signal actuator is raised, as hereinbefore described into contact with the track 50$^a$, the lever 59 will be tilted on its fulcrum, thereby to cause the rod 62 to operate a signal, which may be a mechanical signal, as distinguished from the electrical signal which it is proposed to use in connection with that form of the invention which is depicted in Figure 5 of the drawings.

Referring to the modified form delineated in Figures 8, 9 and 10, parts hereinbefore described have been designated by numerals previously used, with the suffix "b". The flanges 19 of Figure 5 are removed from the carrier 16$^b$ and the carrier is attached by a securing element 18$^b$ to the shaft 11$^b$.

The numeral 70 denotes a track including an upper flange 71 and a lower flange 72. The screw 53$^b$ has a stem 73 passing through the upper flange 71 of the track 70. An insulating bushing 74 is located in the track 70 and receives the shaft 11$^b$. The shaft 11$^b$ rotates in the bushing 74 of the track 70, the track being held against rotation, through the instrumentality of the stem 73, it being possible for the track 70 to slide on the stem 73 and on the shaft 11$^b$, longitudinally of the shaft. An eccentric 75, preferably made of insulating material operates between the flanges 71 and 72 of the track 70 and is carried by the shaft 76 journaled in the body 2$^b$ of the support or casing 1$^b$. At its outer end, the shaft 76 is supplied with a turning head 77 carrying an index 79 adapted to cooperate with a dial 80. A spring 78, corresponding to the spring 30 is provided and exercises the functions of the spring 30.

In Figure 5 of the drawings, the slide or carrier 16 is adjustable longitudinally of the shaft 11, the track 50 being fixed, whereas, in Figure 8, the carrier 16$^b$ is secured at 18$^b$ to the shaft 11$^b$, the track 70 being adjusted longitudinally of the shaft 11$^b$, through the instrumentality of the eccentric 75 and the turning head 77.

What is claimed is:—

1. In a device of the class described, a support; a shaft journaled in the support; cooperating elements comprising a track, and a carrier connected to the shaft to rotate therewith, one of said cooperating elements being adjustable longitudinally of the shaft; means under the control of an operator for adjusting said one of the cooperating elements longitudinally of the shaft; a centrifugal governor mechanism mounted on the carrier; and a signal actuator connected to the governor mechanism and coacting with the track.

2. In a device of the class described, a support; a main shaft journaled in the support; cooperating elements comprising a track, and a carrier connected to the shaft to rotate therewith, one of said cooperating elements being adjustable longitudinally of the shaft, and being provided with flanges; a second shaft journaled in the support and under the control of an operator, the second shaft having an eccentric operating between the flanges; a centrifugal governor mechanism mounted on the carrier; and a signal actuator connected to the governor mechanism and cooperating with the track.

3. In a device of the class described, a support; a main shaft journaled in the support; cooperating elements comprising a track, and a carrier connected to the shaft to rotate therewith, one of said cooperating elements being adjustable longitudinally of the shaft; a second shaft journaled in the support and under the control of an operator; means for effecting an operative connection between the second shaft and said one of the cooperating elements to adjust the same longitudinally of the main shaft; a dial; an index carried by the second shaft and cooperating with the dial; a centrifugal governor mechanism mounted on the carrier; and a signal actuator connected with the governor mechanism and cooperating with the track.

4. A device of the class described comprising a support; a shaft journaled in the support; a carrier connected to the shaft to rotate therewith; a transverse shaft supported for rocking movement in the carrier and having arms; a signal actuator connected to one arm; a weight mounted to reciprocate on the carrier and coacting with the other arm; and spring means for resisting the rocking movement of the transverse shaft responsive to the action of the weight.

5. In a device of the class described, a support; a main shaft journaled in the support; a carrier connected to the main shaft to rotate therewith; transverse shafts supported for rocking movement on the carrier; inner arms carried by the transverse shafts; signal actuators connected to the inner arms; outer arms mounted on the transverse shafts; spring members engaged around the shafts and engaged with the outer arms; retractile springs connecting each of the outer arms with one of the transverse shafts; and weights mounted for reciprocation on the carrier and cooperating with the inner arms.

6. In a device of the class described, a support; a main shaft journaled in the support; a carrier mounted on the main shaft for rotation therewith; a transverse shaft supported for rocking movement on the carrier; arms carried by the transverse shaft; a guide projecting laterally from the carrier; a weight mounted for reciprocation on the guide and coacting with one of the arms to impart rocking movement to the transverse shaft; spring means connected with the other of said arms to resist the rocking movement of the shaft responsive to the weight; and a signal actuator connected with said other arm.

7. In a device of the class described, a support, a main shaft journaled in said support, a carrier mounted on the main shaft for rotation therewith, transverse shafts supported for rocking movement on the carrier, arms carried by said shaft and extending toward each other, a laterally extending guide on the carrier, weights mounted for reciprocation on the guide and coacting with said arms to impart rocking movement to the transverse shafts, spring means connected with one of said arms to resist the rocking movement of the shaft responsive to the weight; and a signal actuator connected with said other arm.

8. In a device of the class described, a support; a shaft mounted to rotate in said support, a carrier mounted for adjustable reciprocation on said shaft and connected to be rotated with the shaft, spaced flanges carried by said carrier, an eccentric located between said flanges, a shaft secured to said eccentric and extending laterally and provided with turning means for actuating it whereby the carrier may be moved on the shaft, a centrifugal governor mechanism mounted on the carrier, and a signal actuator connected to the governor mechanism.

In testimony that we claim the foregoing as our own, we have hereto affixed our signatures.

FRED M. HILLS.
JENNINGS G. AMBROSE.